(12) United States Patent
Maul

(10) Patent No.: US 12,004,684 B2
(45) Date of Patent: Jun. 11, 2024

(54) POT LID

(71) Applicant: Helmut Maul, Weigendorf (DE)

(72) Inventor: Helmut Maul, Weigendorf (DE)

(*) Notice: Subject to any disclaimer, the term of this patent is extended or adjusted under 35 U.S.C. 154(b) by 434 days.

(21) Appl. No.: 17/310,053

(22) PCT Filed: Nov. 15, 2019

(86) PCT No.: PCT/EP2019/081463
§ 371 (c)(1),
(2) Date: Nov. 9, 2021

(87) PCT Pub. No.: WO2020/164766
PCT Pub. Date: Aug. 20, 2020

(65) Prior Publication Data
US 2022/0079378 A1    Mar. 17, 2022

(30) Foreign Application Priority Data
Feb. 13, 2019  (DE) ...................... 20 2019 100 807.5

(51) Int. Cl.
*A47J 36/06*     (2006.01)
*A47J 36/38*     (2006.01)

(52) U.S. Cl.
CPC ............. *A47J 36/06* (2013.01); *A47J 36/064* (2022.01); *A47J 36/38* (2013.01)

(58) Field of Classification Search
CPC .......... A47J 36/064; A47J 36/06; A47J 36/38; B65D 39/16; B65D 51/24; B65D 51/1683; B65D 51/1672; B65D 51/16; Y10S 220/912

USPC .............. 220/573.1, 912, 212.5, 212, 367.1; D9/450, 449, 447, 435
See application file for complete search history.

(56) References Cited

U.S. PATENT DOCUMENTS

| | | | | |
|---|---|---|---|---|
| 4,989,748 | A | * | 2/1991 | Parr, Jr. .................. A47G 19/26 219/734 |
| 2019/0200621 | A1 | * | 7/2019 | Stojanovski ........ A47J 37/0694 |

FOREIGN PATENT DOCUMENTS

| | | | |
|---|---|---|---|
| CN | 208319072 U | 1/2019 | |
| DE | 406317 C | 11/1924 | |
| DE | 202008012826 U1 | 12/2008 | |
| GB | 628068 A | 8/1949 | |
| GB | 941191 A | 11/1963 | |
| JP | 2809725 B2 * | 10/1998 | ......... B65D 51/1616 |

OTHER PUBLICATIONS

Indian Patent Office Examination Report. Issued Feb. 24, 2022.

* cited by examiner

*Primary Examiner* — Robert J Hicks
(74) *Attorney, Agent, or Firm* — WELSH FLAXMAN & GITLER LLC

(57) ABSTRACT

A pot lid for a household cooking pot made up of a conical main body having a lid edge designed to interact with the top edge of a cooking pot or pan. The main body has a central through-opening, wherein the lid bottom side of the pot lid has a downwardly projecting spiral guide wall which extends from the lid edge to the through-opening. The pot lid has, on its lid top side, a channel which is connected to the through-opening, extends at least over part of the lid radius towards the lid edge and is open towards the lid edge.

15 Claims, 2 Drawing Sheets

POT LID

BACKGROUND OF THE INVENTION

The present invention relates to a pot lid for a household cooking pot or pan, and to a cooking pot or pan having a pot lid according to the invention.

SUMMARY OF THE INVENTION

The pot lid comprises a conical or circular disc-shaped main body with a lid edge designed to interact with the top edge of a cooking pot or pan. The main body has a lid top side and a lid bottom side and a central through-opening connecting them. The pot lid may be conical or planar, depending on its intended use. On its lid top side, a channel is arranged which is connected to the through-opening and which is open towards the lid edge.

Such pot lids representing the basic concept of the invention are designed for use in a Bora system in which the vapor extractor is not arranged above the cooking plates but rather between them so that the exhaust air is extracted downwards. Through the channel, which extends preferably closed on the lid top side from the through-opening up to the lid edge, the escaping steam is directed towards that side of the pot or pan where the Bora exhaust opening arranged at the plate level is arranged. In this way, the steam is guided as close as possible to the exhaust opening of the Bora system.

It is an object of the invention to create a pot lid that optimizes the steam exhaust from the pot or pan for use in a Bora system.

According to the invention, the pot lid has a spiral guide wall projecting downwards from the lid bottom side, which extends spirally from the lid edge to the central through-opening. At the lid top side, the through-opening is connected to the channel which is designed to guide the exhaust steam exiting through the through-opening towards the lid wall. For this purpose, the channel extends over at least part of the lid radius, preferably over the entire lid radius, so that its outlet opening is arranged exactly at the lid edge so that the steam exiting at the lid edge can be easily extracted by a Bora exhaust system. The spiral guide wall on the bottom side of the lid harmoniously and continuously guides the exhaust steam toward the outlet opening where it is collected and then continues to move in the channel toward the lid edge. Such a pot lid is optimized for use in a Bora exhaust system since the exhaust steam is effectively collected in the interior of the pot or pan and guided to the through-opening and, on the other hand, is conveyed from the through-opening towards the edge of the lid via the channel which, in particular, is closed.

In one advantageous further development of the invention, the bottom side of the channel can be formed by the lid top side so that the channel is formed either by a pitch circle profile forming the top side and side walls, or by a U-profile attached, for example welded, soldered or fixed with a snap-in connection, on the top side of the pot lid.

Preferably, the channel extends over a sector of the pot lid, in particular from 5 to 30°. In this way, the cross-section of the channel is widened from the through-opening to the lid edge, resulting in a better draught in the channel, which leads to better discharge behavior of the exhaust steam.

Preferably, the side walls of the channel extend approximately radially to the lid and at least approximately vertically. In terms of the manufacturing process, such a geometry of the channel on the lid top side can be easily implemented.

In one advantageous further development of the invention, the top side of the channel extends at least approximately parallel to the lid top side. In this way, the pot lid becomes easier to handle and less bulky so that, for example, it takes up hardly any more space in a dishwasher than a normal pot lid without a guide system for the exhaust steam.

In one advantageous further development of the invention, the spiral wall on the lid bottom side extends continuously from the through-opening up to the lid edge. In this way, a spiral, continuous, i.e. coherent guide for the exhaust steam is formed over the entire lid bottom side, resulting in effective exhaust steam discharge towards the through-opening. Preferably, an adjusting mechanism is arranged in the area of the through-opening to adjust the cross-section of a passage area of the through-opening. This adjusting mechanism allows the regulation of the exhaust steam quantity according to the needs in terms of simmering or boiling of the product. In this case, the adjusting mechanism preferably comprises a rotary mechanism having in each case at least one sector opening in the rotary mechanism which, according to the rotational position of the adjusting mechanism, can be brought more or less to a closing portion fixed relative to the main body. In this way, the size of the through-opening sector can be easily adjusted by rotating the adjusting mechanism, which is preferably connected to a central pot lid handle.

In one advantageous further development of the invention, the channel has an outlet opening downwardly directed towards the lid edge, which leads to the exhaust steam being guided directly towards the exhaust air openings of a Bora system.

Preferably, the cross-section of the channel is widened, in particular continuously widened, towards the lid edge, which leads to the exhaust steam being able to pass through the channel more easily because a kind of suction effect occurs here.

In an advantageous first embodiment of the invention, the spiral wall and/or the channel is formed as a separate part that can be connected to the main body. In this case, the channel and/or the spiral wall can be removed from the main body, for example before cleaning, for example in a dishwasher, whereby the individual parts are easier to clean or possibly even to replace.

In an alternative embodiment advantageous in terms of the manufacturing process, the main body and the spiral wall and/or the channel are made in one piece, in particular from metal. For example, the spiral wall can be stamped into the bottom side of the main body, while the channel on the top side of the main body can be applied by conventional joining techniques. For example, a detachable snap-lock connection for securing the channel is conceivable here. Here, the channel can preferably be fixed at two points of the main body, namely preferably in the area of the central through-opening as well as at the lid edge. Towards the through-opening, the channel can also be fixed to the rotary knob.

The invention also relates, of course, to a cooking pot or pan comprising a pot lid of the type described above for fitting onto the edge of the pot or pan.

The following expressions are used synonymously: Lid top side—top side of the main body; lid bottom side—bottom side of the main body.

It is obvious to the person skilled in the art that the above-described embodiments can be combined with one another in any desired manner.

BRIEF DESCRIPTION OF THE DRAWINGS

The invention is described below by way of example with reference to the schematic drawing. In the figures.

DETAILED DESCRIPTION OF THE INVENTION

Figure 1:
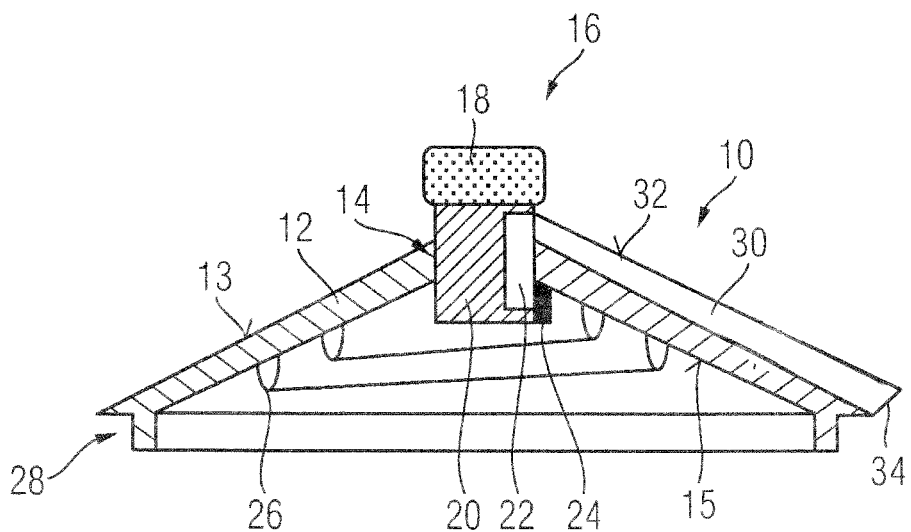
FIG. 1 shows a partially cut vertical cross-section through a pot lid according to the invention.
Figure 2:
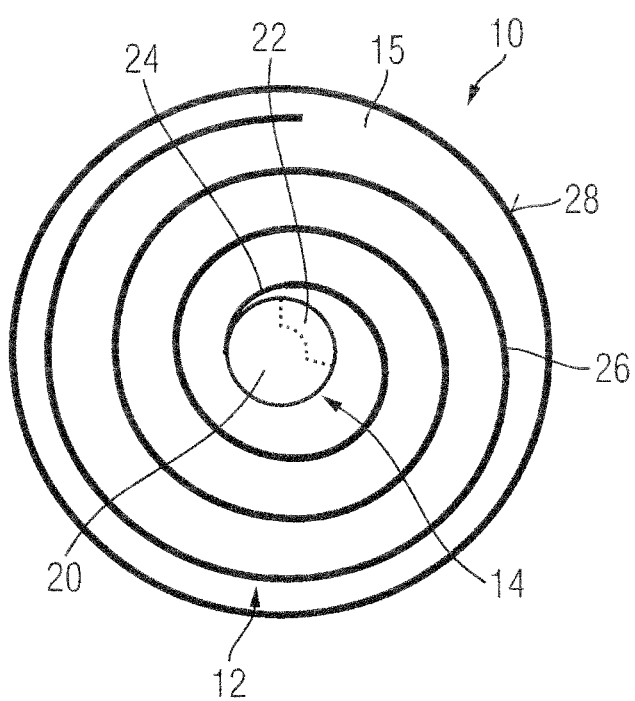
FIG. 2 shows a plan view from below of the lid bottom side.

The pot lid is described below with reference to all three figures, which show an embodiment of the pot lid 10 from various perspectives.

The pot lid 10 shown has a conical main body 12. However, the main body 12 may also be in the form of a flat circular plate, in which case the through-opening is at least approximately at the same level as the lid edge. The pot lid 10 has a lid top side 13 and a lid bottom side 15. In the center of the main body 12, a central through-opening 14 is formed in which a rotary knob 16 having a handle 18 for handling the pot lid 10 is rotatably received. The knob 16 is rotatably held in the central through-opening 14 and has a shaft portion 20 which has an open passage sector 22 connecting the lid top side 15 to the lid bottom side 13. By rotating the rotary knob 16, the passage sector 22 can be brought more or less in congruence with a closing portion 24 arranged on the lid bottom side 15, e.g., projecting downwardly and extending approximately over a sector at the edge of the through-opening 14 which has the same size as the passage sector 22 in the shaft portion 20 of the rotary knob 16. The size of the passage cross-section for the discharge of the exhaust steam can thus be adjusted by the fact that the passage sector 24 in the shaft part 20 of the rotary knob 16 is more or less covered by the closing portion 24.

Figure 3:
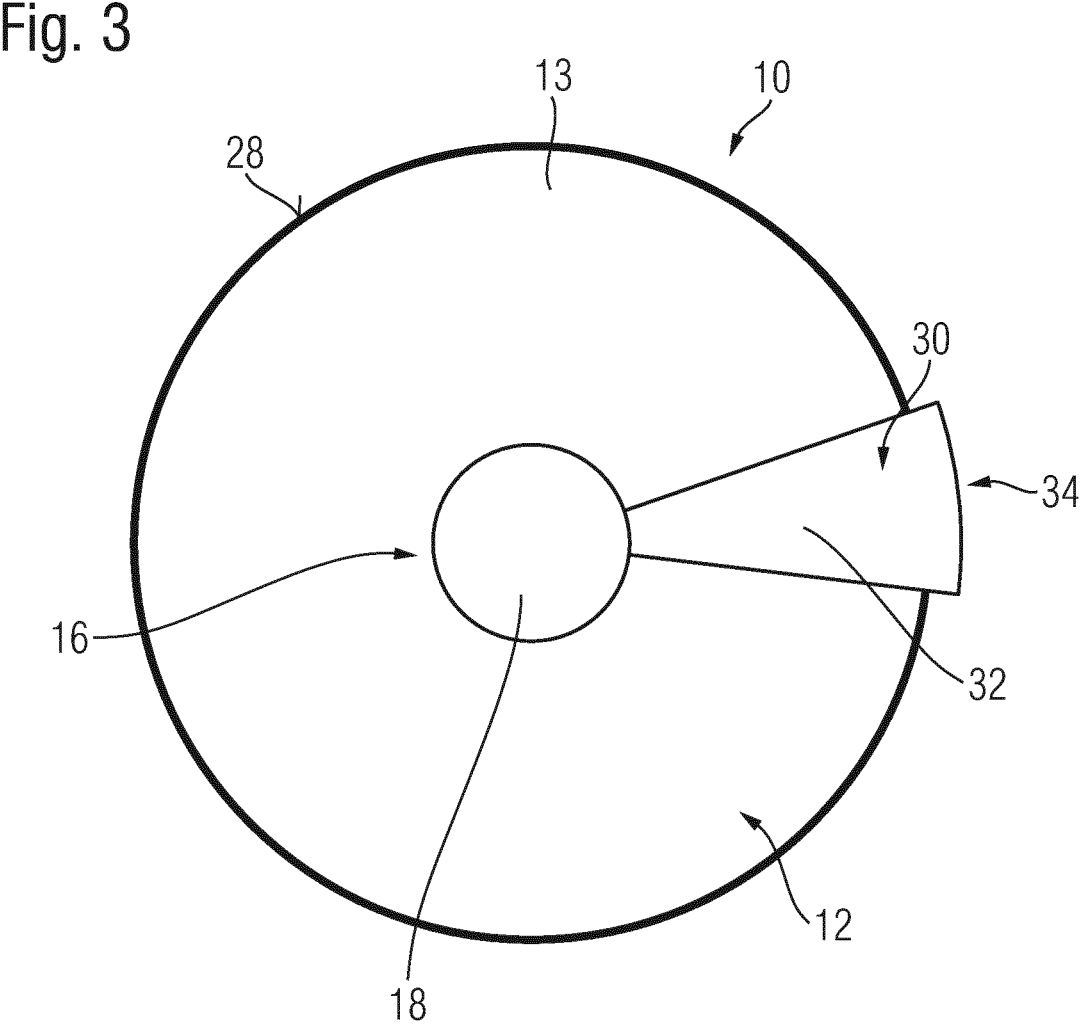
FIG. 3 shows a plan view from above of the lid top side.

On its bottom side, the main body 12 has a spiral guide wall 26 which extends from the lid edge 28 to the central through-opening 14. On the lid top side, a channel 30 is arranged which preferably extends over a sector of the pot lid and thus is widened from the center of the pot lid 10 towards the outside (see FIG. 3). The channel is preferably closed—except for the connection to the passage cross-section 22 and to an outlet opening 34 arranged at its outer end—so that the steam is directed completely towards the outlet opening 34, where it can be extracted, in particular by a Bora exhaust system.

As can be seen from FIG. 1, the top side 32 of the channel 30 extends approximately parallel to the lid top side 13. Protruding slightly beyond the lid edge 28, the downward-facing outlet opening 34 delimits the channel 30 to the outside. The channel 30 is open towards the passage sector 22 of the shaft portion 20 of the rotary knob 16 when the latter is not covered by the closing portion 24. In this way, exhaust steam can be effectively guided by means of the spiral guide wall 26 from the lid bottom side 15 to the passage sector 22, pass therethrough and be guided via the channel 30 through the outlet opening 34 to the lid edge 28 where it is exhausted downwards by a Bora exhaust system. The pot lid shown is thus very capable to remove the water and grease vapor occurring during a cooking or frying process for a Bora exhaust system.

It should still be noted that the spiral guide wall 26 and the channel 30 can be formed integrally on the main body, or as separate elements. For example, the channel 30 can be a U-profile, which can be attached to the lid top side 13 by conventional joining techniques, such as welding or soldering.

If the channel is to be removable, it can also be secured to the top side by a releasable latching technology, for example between the knob 16 and the lid edge 28.

The spiral guide wall 26 on the bottom side of the main body 12 can also be manufactured integrally with the main body 12, for example by stamping or welding, or as a separate part in the form of a spiral wall insert removably retained on the lid bottom side 15. In this way, for example, easy cleaning of the individual components is possible.

Of course, the adjusting mechanism in the area of the through-opening 14 can be of a different design than in the exemplary embodiment illustrated. Likewise, the channel 30 does not have to extend over a sector of the pot lid but can have side walls parallel to one another. The channel can be formed by a U-profile fixed upside down on the lid top side 13, or it can be formed as a channel 30 closed all around, which is either fixedly connected or detachably arranged on the lid top side 13.

The invention is not limited to the illustrated exemplary embodiment but can be varied within the scope of the appended claims.

REFERENCE LIST 10 pot lid
12 main body
13 lid top side
14 through-opening
15 lid bottom side
16 rotary knob
18 handle
20 shaft part of rotary knob
22 passage sector
24 closing portion
26 spiral guide wall
28 lid edge
30 channel
32 topside of channel
34 outlet opening of the channel a sector over which the channel extends

The invention claimed is:

1. A pot lid for a household cooking pot, the pot lid comprising a conical main body having a lid edge interacting with a top edge of the household cooking pot, the conical main body of the pot lid comprises a central through-opening, wherein a lid bottom side of the pot lid comprises a downwardly projecting spiral guide wall extending from the lid edge to the central through-opening, and the pot lid further comprising, on a lid top side, a channel connected to the central through-opening, the channel extends at least over part of a lid radius towards the lid edge and the channel is open towards the lid edge.

2. The pot lid according to claim 1, wherein a bottom side of the channel is formed by the lid top side.

3. The pot lid according to claim 1, wherein the channel extends over a sector of the pot lid at an angle from 5 to 30 degrees.

4. The pot lid according to claim 1, wherein side walls of the channel extend radially and vertically.

5. The pot lid according to claim 1, wherein a top side of the channel extends at least approximately parallel to the lid top side.

6. The pot lid according to claim 1, wherein a spiral guide wall extends continuously between the central through-opening and the lid edge.

7. The pot lid according to claim 1, wherein an adjusting device—for changing a size of a passage cross-section is arranged in the central through-opening.

8. The pot lid according to claim 7, wherein the adjusting device comprises a rotary knob with a passage sector which, according to a rotational position of the rotary knob, is brought in congruence with a closing portion fixedly arranged on the conical main body.

9. The pot lid according to claim 1, wherein the channel has an outlet opening downwardly directed towards the lid edge.

10. The pot lid according to claim 1, wherein a cross-section of the channel is widened, towards the lid edge.

11. The pot lid according to claim 6, wherein the spiral guide wall or the channel is formed as a separate part that can be removed from the conical main body.

12. The pot lid according to claim 6, wherein the conical main body is formed integrally with the spiral guide wall, and is made of a metal.

13. The pot lid according to claim 1, wherein the conical main body is formed integrally with the channel, and is made of a metal.

14. A cooking pot comprising a pot body and the pot lid according to claim 1 for fitting onto the pot body.

15. A pan comprising a main pan body and the pot lid according to claim 1 for fitting onto the main pan body.

* * * * *